United States Patent
Betta et al.

(10) Patent No.: US 7,035,260 B1
(45) Date of Patent: Apr. 25, 2006

(54) VOICE OVER IP SERVICE IMPLEMENTATION FOR PROVIDING MULTIMEDIA FEATURES

(75) Inventors: Carl E. Betta, Freehold, NJ (US); Gerald L Hoover, Red Bank, NJ (US); John Jutten Lawser, Holmdel, NJ (US); James J. Mansell, Fair Haven, NJ (US); Han Q. Nguyen, Marlboro, NJ (US); Larry Arnise Russell, Atlantic Highlands, NJ (US)

(73) Assignee: AT&T Corp., Bedminster, NJ (US)

( * ) Notice: Subject to any disclaimer, the term of this patent is extended or adjusted under 35 U.S.C. 154(b) by 959 days.

(21) Appl. No.: 09/939,871

(22) Filed: Aug. 27, 2001

(51) Int. Cl.
*H04L 12/28* (2006.01)
*H04L 12/56* (2006.01)

(52) U.S. Cl. ..................... 370/392; 370/401
(58) Field of Classification Search ........ 370/352–354, 370/356, 389, 392, 400–401
See application file for complete search history.

(56) References Cited

U.S. PATENT DOCUMENTS 6,625,141 B1 * 9/2003 Glitho et al. ............... 370/352

OTHER PUBLICATIONS

U.S. Appl. No. 09/824,378, filed Apr. 2, 2001, entitled "Technique For Providing Intelligent Features For Calls In A Communications Network Independent Of Network Architecture."

* cited by examiner

*Primary Examiner*—Chi Pham
*Assistant Examiner*—Ronald Abelson

(57) ABSTRACT

A network architecture (10) provides Voice over Internet Protocol (VoIP) service as well as multimedia and Internet web-based applications while implementing features common in a traditional telecommunications network. In response to an incoming call dialed to an IP endpoint (32, 34), the network will process the call, and in particular, convert the call, if in not already in a VoIP format, to such a format, while mapping signaling associated with the call into a compatible format. The VoIP call is then routed to the IP endpoint. In the event that the call requires an associated multimedia or Internet-web-based application, the network will initiate the application. Processing of the incoming call may require accessing of a common database to acquire a location routing number for the call destination. To afford dynamic addressing of the IP endpoints, each may be referenced by a corresponding Universal Resource Locator (URL) (or other indirect mapping) associated with the IP address of the endpoint.

29 Claims, 2 Drawing Sheets

10

VOICE OVER IP SERVICE IMPLEMENTATION FOR PROVIDING MULTIMEDIA FEATURES

TECHNICAL FIELD

This invention relates to a technique for providing a Voice-Over Internet Protocol (VoIP) service implementation that affords a subscriber all of the features of an embedded traditional voice network while providing support for multimedia and Internet-based web applications.

BACKGROUND ART

Traditionally, telephone subscribers have received Plain-Old Telephone Service (POTS) from a Public Switched Telephone Network (PSTN). In a conventional PSTN, the receipt of an incoming featured call (e.g., an 8XX, 900 or SDN call), at an ingress telephone switch of a toll network, such as the AT&T network triggers a query to a database, typically known as a Service Control Point (SCP) or a Network Control Point to obtain instructions for processing the call. Over time, and often at great expense, conventional toll networks have established a large embedded base of voice features for such featured calls, such as for example, time-of-day routing.

Today, providers of telecommunications service have begun to migrate from traditional circuit-switched networks to packet-based networks that offer Voice over Internet Protocol (VoIP) telephony. However, in connection with such a migration, service providers do not want to forego the opportunity to provide their subscribers with conventional services traditionally available in the circuit-switched PSTN.

Heretofore, a service provider migrating to a packet network architecture had to employ a call handling mechanism within the packet network itself to re-create the call features traditionally available in the circuit-switched PSTN. Adding such a call handling mechanism to a packet network to re-create the embedded features in the PSTN imposes a significant cost. U.S. patent application Ser. No. 09/824,378, filed Apr. 2, 2001, entitled "Technique For Providing Intelligent Features For Calls In A Communications Network Independent Of Network Architecture" and assigned to AT&T, (incorporated by reference herein) describes an approach for overcoming this problem by utilizing a common database in telecommunications network having both circuit-switched and packet-based call handling systems. The database contains a common set of call processing instructions accessible to both the circuit-switched and packet-based call handling systems thus avoiding the need to replicate features embedded in the circuit-switched components for use by the packet-based call handling mechanism.

While the approach described in the aforementioned '378 application does resolve some of the difficulties associated with providing conventional calling features to VoIP calls, the approach does not address how to afford an IP endpoint the ability to implement a stateless or stateful multimedia application. The '378 application also does not address the need to provide local number portability, and dynamic addressing of network endpoints.

Thus, there is a need for a technique for providing a Voice-Over Internet Protocol (VoIP) service implementation that overcomes the aforementioned disadvantages of the prior art.

BRIEF SUMMARY OF THE INVENTION

Briefly, in accordance with a first aspect of the invention, there is provided a method for processing a call dialed to an IP endpoint in a communications network to afford the endpoint the ability to implement a multimedia application if desired. In accordance with the method, the call is received in the network server for processing. In practice, a voice (POTS) call originated at a traditional telephone is converted into a VoIP format and signaling information associated with the voice call is mapped into an appropriate format corresponding to the VoIP call. In response to the receipt of the call, a session is established with the IP endpoint by first resolving the address associated with the end point. In connection with the call, a determination is made whether the called endpoint IP end point desires a multimedia application, and if so, the desired multimedia application is desired.

In accordance with another aspect of the invention, a method is provided for routing calls that originate either in a traditional circuit-switched environment, such as a PSTN or in a packet-based network and are dialed to an endpoint such that a common local routing number database is employed for Local Number Portability queries. In accordance with the method, an incoming call is received at one of a voice and IP call servers, depending on whether the call is formatted as a traditional voice (POTS) call or has a VoIP format. In response to a call at one of the call servers, a query is launched to a common Local Number Portability (LNP) database serving both call servers. The LNP database responds with a local routing number returned to the requesting call server, which in turn routes the call to its intended destination.

In accordance with yet another aspect of the invention, a method is provided for processing a call dialed to an IP endpoint in a communications network to afford dynamic addressing. In accordance with the method, the call is received in the network at a call server for processing. In response to the receipt of a call, the call server establishes a session with the IP endpoint by referencing the dialed end point through a Universal Resource Locator (URL) assigned to that end point. Using a URL in place of conventional IP address allows for dynamic address assignment, and allows for various call handling options when the end point is unavailable.

DETAILED DESCRIPTION

Figure 1:
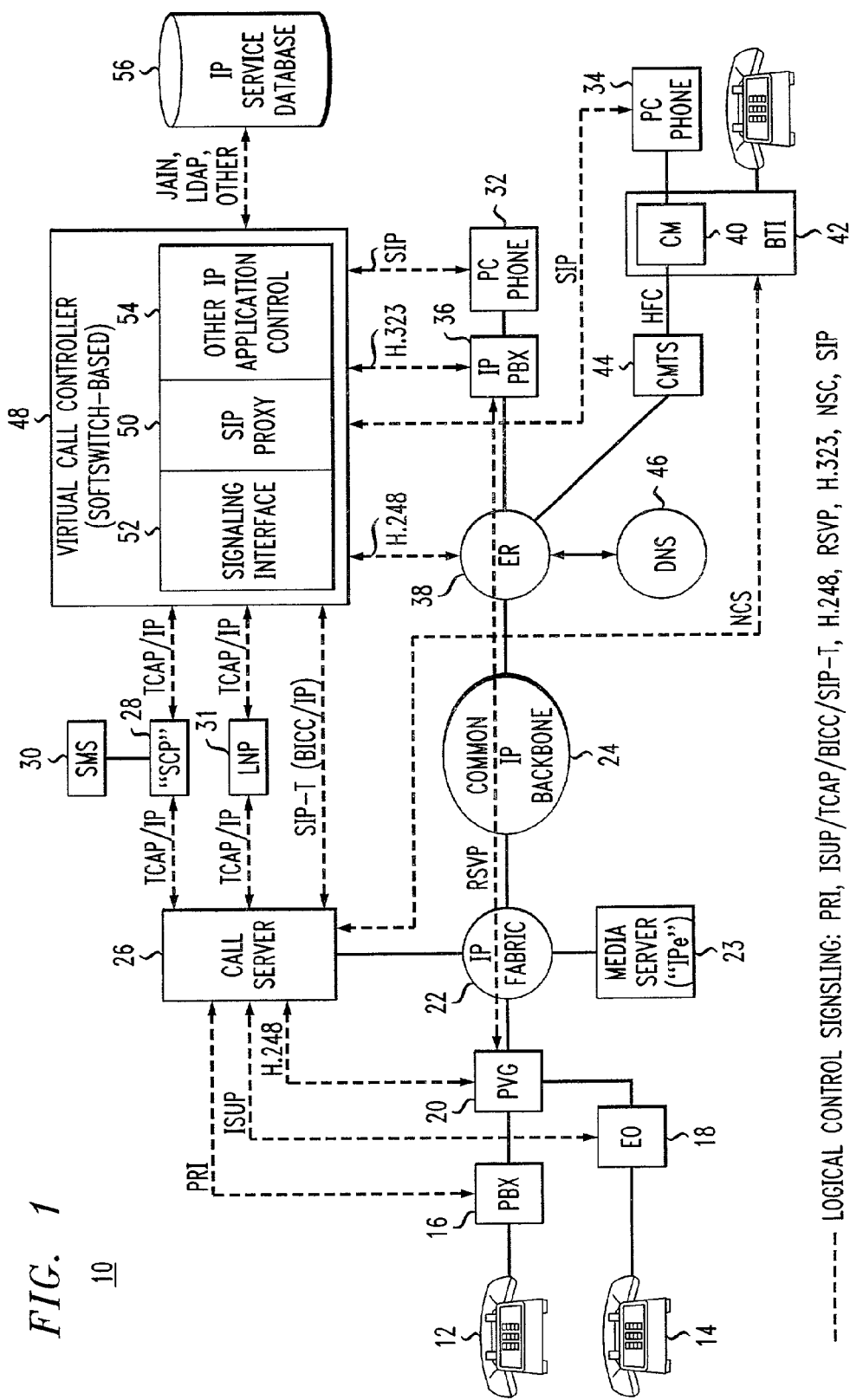
FIG. 1 depicts a block schematic diagram of a network architecture in accordance with a preferred embodiment of the invention for providing VoIP service.

FIG. 1 shows a block schematic diagram of a network architecture 10 for providing Voice over Internet Protocol (VoIP) services to both traditional voice endpoints (POTS terminals) as well as Internet Protocol (IP) endpoints. In the illustrated embodiment, the network 10 serves conventional (POTS) voice terminals 12 and 14 through a PBX 16 and an End Office (EO) 18, respectively. (While FIG. 1 depicts a pair of voice terminals 12 and 14, the network 10 can readily serve a larger or smaller number of such terminals without departing from the scope of the invention.) Both the PBX 14 and the EO 16 have bearer connections to a Packet-Voice Gateway (PVG) 20 that converts Time-Division Multiplexed (TDM) calls originated at the voice terminals 12 and 14 into an IP packet format for routing by a packet fabric 22 into an IP common back bone 24, typically via the Resource Reservation Protocol (RSVP). In this embodiment, the PVG 20 comprises a media gateway manufactured by Nortel Networks, Richardson, Tex., whereas the IP fabric comprises a Nortel Network's Passport 8600 Routing Switch.

In connection with routing the call, the Call Server 26 as instructed by SCP 28 may need to provide some specialized functions. For example, the Media Server 23 may need to collect digits, provide announcements, and/or perform speech recognition. To that end, the Call Server 26 instructs the PVG 20 to establish a temporary bearer path connection via the IP fabric 22 to a media server 23 that functions as an Intelligent Peripheral (IPe) to collect the required data and provide the requisite announcements and other services that may be required in connection with the call.

A voice call server 26 has a signaling link to each of the PBX 16, the EO 18 and the PVG 20 for providing the necessary signaling information to the PBX, the EO and PVG, respectively, to perform the required call set-up and call teardown functions. In this embodiment, the call server 26 comprises a Nortel Networks Succession Model CS 2000 call server that has a Primary Rate Interface (PRI) signaling link to the PBX 16, an Integrated Services User Part (ISUP) signaling link to the EO 18, and a H.248 protocol link to the PVG 20. No only does the call server 26 perform the signaling to effect call set-up and call tear-down, the call server also typically records events for downstream billing, as well as providing alarms and measurements for trouble shooting and maintenance.

The voice call server 26 has a signaling link to a SCP 28 (i.e., a database) that contains call-processing instructions. The call processing instructions in the SCP 28 provide the call server 26 with routing information for handling special-featured calls, such as those dialed to an 800, 888, 877, 866, 900, 700, or 500 exchange, as well as SDN calls. In practice, the call server 26 queries the SCP 28 using the Transaction Capabilities Application Protocol (TCAP) routed via a SS7 link or an IP query over an IP network (we use TCAP over IP but it could be any suitable protocol such as SIP).

As an example of the call processing instructions provided by the SCP 28, consider an incoming call dialed to an 8YY number for which the called party has requested time of day routing. Upon receipt of such a call in the network 10, the call server 26, when so notified of such a call from either the PBX 16 or the EO 18, will query the SCP 28 for routing instructions. Depending on the time of day, the SCP 28 will return different routing instructions corresponding to the desired routing by the called party. To populate the SCP 28 with the appropriate routing instructions to effectuate the desired call routing, the operator of the network 10 will typically make use of a Service Management System (SMS) 30. The SMS 30 receives customer input data regarding desired call treatment and converts that information into one or more appropriately formatted instructions for entry in the SCP 28.

In addition to a link to the SCP 28, the call server 26 also has a signaling link to a second database 31, typically referred to as a Local Number Portability (LNP) database because it stores location routing numbers. Telephone subscribers in a given telephone exchange sometimes choose to switch their provider of local service, but yet elect to retain their original telephone numbers. To route a call to such subscribers that have elected to retain their original numbers, the current service provider will typically assign a location routing number (LRN) corresponding to the original telephone number elected by the subscriber. Prior to routing a call, the call server 26 queries the LNP database 31 for the location routing number, typically via a TCAP over IP query. While the network 10 of FIG. 1 depicts separate databases 28 and 31 for call routing instructions and location routing numbers, respectively, a single database, (i.e., the SCP itself) could contain both call routing instructions and location routing numbers. Thus, a single query to such a combined database would result in a return to the call server 26 of both routing instructions and a location routing number.

In addition to serving the voice end points 12 and 14, the network 10 also serves one or more IP endpoints, illustratively exemplified by PC phones 32 and 34. The end points could take other forms, such as IP telephone sets, set top boxes or other wired or wireless devices that operate via an IP link. (While FIG. 1 illustrates only two IP end points, the network 10 could easily support a larger or smaller number of such end points without departing from the scope of the invention.) In the illustrated embodiment, the network 10 serves the PC telephone 32 through an IP PBX 36 having a bearer path to an Edge Router 38, which in turn is linked to the common IP backbone 24. The PC telephone 34 is served via a Cable Modem (CM) comprising part of a Broadband Telephone Interface 42, typically coupled via Hybrid fiber coax connection to a Cable Modem Termination System (CMTS) 44 linked via a bearer path to the ER 38. The ER 38 serves to route an incoming call to one of the PC phones 32 and 34 that originated from the other of the PC phones or from one of the voice terminals 12 and 14. In that regard the Call Server 26 may need to access a Domain Name Server (DNS) 46 for resolving address information for the call destination. Not only does the ER 38 route calls, the ER may also implement any desired Quality of Service (QoS) algorithms to assure a guaranteed level of service for telephony and multimedia applications.

A Virtual Call Controller (VCC) 48, typically in the form of an IP softswitch of a type available from one of several vendors of telecommunication equipment, has signaling links to each PC phones 32 and 34 and to the IP PBX 36. In practice, the VCC 48 includes a Session Initiation Protocol (SIP) proxy 50 that communicates signaling information to the PC phones 32 and 34, the IP PBX 36 and the ER 38 using the Session Initiation Protocol. The SIP proxy 50 also includes a Gatekeeper function that uses the H.323 protocol for communicating with the IP PBX 36 and the H.248 protocol for communicating with the ER 38, although the SIP proxy could employ other protocols as well. By virtue of its signaling links to the PC phones 32 and 34, the IP PBX 36 and the ER 38, the SIP proxy 50 provides the proxy function (i.e., the signaling information and address resolution) to control set-up and tear down of calls originating from, and terminating at the PC phones. Also, by controlling the ER 38, the SIP proxy server 50 assures that customers who require a guaranteed level of service receive such service.

The VCC 48 has a signaling interface 52 through which the call controller launches a TCAPover IP query on a signaling link to the LNP database 31 for a location routing number. In addition, the signaling interface 52 allows the VCC 48 to launch TCAPover IP query to the SCP 28 to receive call-handling instructions. Like the aforementioned U.S. patent application Ser. No. 09/824,378 (incorporated by reference herein), the network 10 employs a common SCP 28 that is accessible to both the VCC 48 and the voice call server 26. In this way, a customer can have same routing logic controlling the routing of voice calls to and from the voice terminals, such as voice terminals 12 and 14, and IP calls to and from the IP endpoints, such as PC phones 32 and 34. Although FIG. 1 depicts the SCP 28 as a single database, in practice, the call server 26 and VCC 48 could access separate SCPs, each containing the identical routing information.

In addition to having a signaling link to the SCP 28 and the LNP database 31, the signaling interface 52 of the VCC 48 enjoys a direct signaling link to the call server 26 to allow the exchange of signaling information via the SIP-T or BICC over IP protocol (BICC and TCAP can also work over the conventional SS7 signaling network.). In this way, the VCC 48 may effectively interwork with the voice call server 26 for non-featured calls directed to one of the voice terminals 12 and 14 from one of the IP endpoints.

Along with the SIP proxy 50 and the signaling interface 52, the VCC 48 further includes an IP applications controller 54 for controlling IP and/or multimedia applications requested by one of the IP endpoints, such as one of PC phones 32 and 42. To that end, the IP applications controller 54 of the VCC 48 has a signaling link to a IP services database 56 so that the IP applications controller can launch a query via one of several known protocols, such as SIP, or Java Advanced Integrated Network (JAIN), or Lightweight Data Access Protocol (LDAP), to gain the requisite information needed to control the desired IP application. In some instances, the desired application is a "stateful" application that requires certain record keeping and other management activities so that the IP controller 54 remains involved during the application. Other desired applications may be so-called "stateless" applications where no record keeping or management is required in which case, the IP controller simply initiates the desired application and thereafter drops off so that the end points (i.e., the PC phones 32 and 34) will communicate directly, via the Internet or such other connection and implement any desired features.

Figure 2:
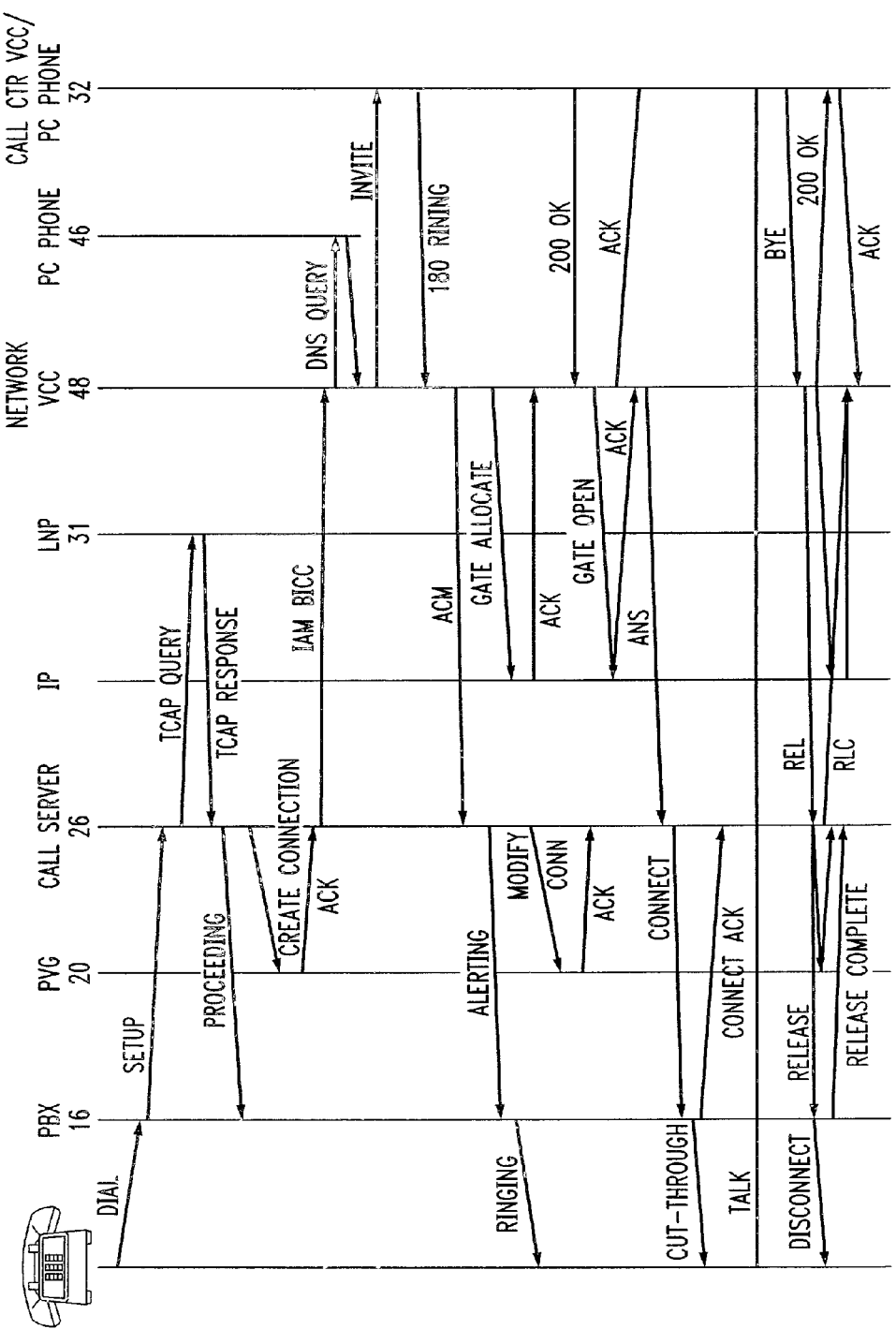
FIG. 2 depicts a illustrative call flow for the network of FIG. 1.

FIG. 2 shows an illustrative call flow in the network 10 of FIG. 1 for a voice call launched from the voice terminal 12 to a call center served by the IP PBX 36. The call flow proceeds as 1. The caller (represented by voice terminal 12) dials a 10-digit number of the call center.
2. The PBX 16 collects the dialed digits, analyzes them and determines that the information concerning the call should be routed to the call server 26. The PBX 16 sends information in a Q.931 setup message that includes the called number, the circuit the PBX will use for the voice path and optionally the calling number of the caller.
3. The voice call server 26 receives the setup message, analyzes it, and formulates a query (i.e., a TCAP query) that contains the dialed number, the call reference number, and other information. The voice call server launches the query to the SCP 28 for further processing.
4. The SCP 28 receives the query, and processes it according to information and logic input stored in the SCP from the customer. The SCP 28 forms a TCAP response that is sent to the voice call server 26.
5. The voice call server 26 receives the TCAP response, and in turn, sends a Q.931 proceeding message to the PBX 16. Additionally, the voice server call server 26 sends a H.248 protocol create connection message to the PVG 20 which enables a conversion of the digital circuit (from the PBX 16) to an IP packet port.
6. The PVG 20 sends an acknowledgement message to the voice call server 26 that the "connection" has been made.
7. The voice call server 26 formulates a BICC Initial Address Message (BICC IAM) that contains the IP address of the PVG 20, the routing number, and other information (e.g. calling number) that is sent to the VCC 48. Note that in cases where the number has been ported, the voice call server 26 must query the LNP database 31 to determine the routing number. In this case the LRN response points to VCC 48, but in general it could indicate another Call Server, or a circuit switch, or even another network. This is a TCAP query that is similar to the SCP query in steps 3 and 4.
8. The VCC 48 receives the BICC IAM and formulates a DNS query containing the routing number that is sent to the DNS server 46. The DNS 46 receives the query and translates the routing number into an IP address of the call center PC phone 32. The DNS 46 returns the IP number to the VCC 48. (Of course, in the case of a circuit endpoint or another circuit or IP network, the DNS will return the IP address of the gateway to that network.)
9. The VCC 48 formulates and sends a SIP Invite message to the Call Center PC phone 32.
10. The Call center PC phone returns a SIP 183 message that contains the IP address on which the PC phone will receive the bearer stream, typically in a Real Time Transport (RTP) protocol stream, and alerts the called party that a call is incoming.
11. The VCC 48 receives the 183 message and formulates a BICC Address Complete Message (BICC ACM), which contains the IP address that the PC phone 32 will receive the incoming RTP stream.
12. The voice call server 26 receives the BICC ACM message and sends an alerting message to the PBX 16
13. The PBX 16 plays ringing to the calling party.
14. After receiving the 183 message, the VCC 48 sends a gate allocate message to the ER 38 to reserve a gate for the RTP stream from the PC phone 32. The ER 38 acknowledges the message.
15. The voice call server 26 sends a modify connection to the PVG 20 to open the gate so packets can flow via a voice circuit to the PBX 16.
16. The called party answers the PC phone 32 and sends a SIP 2000K message to the VCC 48.
17. The VCC sends an H.248 message to the ER 38 to open the gate. The ER 38 router acknowledges the message.
18. The VCC 48 sends a BICC Answer message to the voice call server 26.
19. The PBX 16 receives the Q.931 connect message and cuts through the call to the calling party (voice terminal 12). The PBX 16 sends a connect acknowledge message to the voice call server 26
20. The talking path is established.
21. When the subscriber at the PC phone 32 hangs up, the phone sends a SIP BYE message. The VCC 48 acknowledges this message with a 2000K and the PC phone 32 acknowledges this message with and ACK.
22. The VCC 48 sends a BICC Release message to the voice call server 26. The voice call server 26 sends a release message to the PVG 20
23. The VCC 48 sends a H.248 release message to the ER 38.

24. The voice call server 26 sends a Q.931 release message to the PBX 16, which, in turn sends a Q.931 release complete message back to the VCC 26.

25. The PBX 16 disconnects voice terminal 12.

The foregoing describes a technique for providing a Voice-Over Internet Protocol (VoIP) service implementation that affords a subscriber all of the features of an embedded traditional voice network while providing support for multimedia and Internet-based web applications.

The above-described embodiments merely illustrate the principles of the invention. Those skilled in the art may make various modifications and changes that will embody the principles of the invention and fall within the spirit and scope thereof.

What is claimed is:

1. A method for processing a call in a communications network dialed to an Internet Protocol (IP) endpoint to afford the IP endpoint the ability to implement a desired multimedia application in connection with the call, comprising the steps of:
    receiving the call in the network for processing, wherein said receiving the call includes accessing a common database for call processing instructions irrespective of the format of the call;
    establishing a session with the IP endpoint by resolving an address associated with the endpoint;
    routing the call to the IP endpoint;
    determining if the IP endpoint to which the call is routed to requires a multimedia application, and if so, providing such application.

2. The method according to claim 1 wherein the call received in the network is a voice call and wherein the voice call is processed by converting the call into a Voice-over Internet Protocol (VoIP) call and wherein signaling information associated with the voice call is mapped into a format compatible with said VoIP call.

3. The method according to claim 1 wherein the multimedia application is a stateful application and wherein the network actively monitors such application while the call remains active.

4. The method according to claim 1 wherein the multimedia application is a stateless application and wherein the network does not actively monitor the application.

5. The method according to claim 1 wherein the multimedia application includes access to the Internet.

6. The method according to claim 1 wherein resolving the address of the IP endpoint includes referencing the IP endpoint through a Universal Resource Locator (URL) (or other indirect mapping) assigned to an address associated with that IP endpoint.

7. The method according to claim 6 further including the step of dynamically assigning the address of the IP endpoint associated with the URL.

8. The method according to claim 1 wherein the step of receiving the call for processing includes the step of accessing a common database to obtain a location routing number for routing the call.

9. The method according to claim 1 wherein the step of receiving the call for processing includes the step of accessing a common database for call processing instructions irrespective of the format of the call and to obtain a location routing number for routing the call.

10. A method for processing a call in a communications network dialed to an Internet Protocol (IP) endpoint to afford the IP endpoint the ability to implement a desired multimedia application in connection with the call, comprising the steps of:
    receiving the call in the network for processing, and if the call has a voice format, then converting the call into a Voice-over Internet Protocol (VoIP) call and mapping signaling information associated with the voice call into a format compatible with said VoIP call, wherein said receiving the call includes accessing a common database for call processing instructions;
    establishing a session with the IP endpoint by resolving an address associated with the endpoint;
    routing the VoIP call to the endpoint;
    determining if the IP end point to which call routed to the endpoint requires a multimedia application, and if so, providing such application.

11. The method according to claim 10 wherein the multimedia application is a stateful application and wherein the network actively monitors such application while the call remains active.

12. The method according to claim 10 wherein the multimedia application is a stateless application and wherein the network does not actively monitor the application.

13. The method according to claim 10 wherein the multimedia application includes access to the Internet.

14. The method according to claim 10 wherein resolving the address of the IP endpoint includes referencing the IP endpoint through a Universal Resource Locator (URL) (or other mapping) assigned to an address associated with that IP endpoint.

15. The method according to claim 10 further including the step of dynamically assigning the address of the IP endpoint associated with the URL.

16. The method according to claim 10 wherein the step of receiving the call for processing includes the step of accessing a common database to obtain a location routing number for routing the call.

17. The method according to claim 10 wherein the step of receiving the call for processing includes the step of accessing a common database for call processing instructions and to obtain a location routing number for routing the call.

18. A method for processing a call having a first format in a communications network dialed to an Internet Protocol (IP) endpoint to afford the IP endpoint the ability to implement a desired multimedia application in connection with the call, comprising the steps of:
    receiving the call in the network for processing, including accessing a first common database, irrespective of the call format, obtain a location routing number for routing the call;
    establishing a session with the IP endpoint by resolving an address associated with the endpoint; and
    routing the call to the endpoint.

19. The method according to claim 18 wherein the step of receiving the call for processing includes the step of accessing a second common database for call processing instructions.

20. The method accordance to claim 18 wherein the first common database is accessed to obtain the location routing number and call processing instructions for processing instructions.

21. The method according to claim 18 further including the steps of:
    determining if the IP end point to which call routed to the endpoint requires a multimedia application, and if so, providing such application.

22. The method according to claim 21 wherein the multimedia application is a stateful application and wherein the network actively monitors such application while the call remains active.

23. The method according to claim 21 wherein the multimedia application is a stateless application and wherein the network does not actively monitor the application.

24. The method according to claim 21 wherein the multimedia application includes access to the Internet.

25. The method according to claim 18 wherein resolving the address of the IP endpoint includes referencing the IP endpoint through a Universal Resource Locator (URL) (or other indirect mapping) assigned to an address associated with that IP endpoint.

26. The method according to claim 25 further including the step of dynamically assigning the address of the IP endpoint associated with the URL.

27. The method according to claim 18 wherein the call received in the network has a voice format and wherein the voice call is processed by converting the call into a Voice-over Internet Protocol (VoIP) formatted call and wherein signaling information associated with the voice call is mapped into a format compatible with said VoIP formatted call.

28. A method for processing a call in a communications network dialed to an Internet Protocol (IP) endpoint to afford the IP endpoint the ability to implement a desired multimedia application in connection with the call, comprising the steps of:

receiving the call in the network for processing, wherein said receiving the call includes accessing a common database for call processing instructions irrespective of the format of the call;

establishing a session with the IP endpoint by referencing the IP endpoint through a Universal Resource Locator (URL) assigned to an address associated with that IP endpoint; and routing the call to the endpoint.

29. The method according to claim 28 further including the step of dynamically assigning the address of the IP endpoint associated with the URL.

* * * * *